United States Patent [19]

Kerr et al.

[11] Patent Number: 5,298,303
[45] Date of Patent: Mar. 29, 1994

[54] FABRIC STRUCTURE FOR SEVERE USE APPLICATIONS

[75] Inventors: Richard C. Kerr, Rutherfordton, N.C.; John R. Damewood; Jill R. Menzel, both of Spartanburg, S.C.; Eddie L. Jarvis, Charlotte, N.C.; Bert A. Ross, Conyngham, Pa.

[73] Assignee: Reeves Brothers, Inc., Spartanburg, S.C.

[21] Appl. No.: 788,653

[22] Filed: Nov. 6, 1991

Related U.S. Application Data

[63] Continuation-in-part of Ser. No. 695,852, May 6, 1991, Pat. No. 5,110,666, which is a continuation-in-part of Ser. No. 326,183, Mar. 20, 1989, Pat. No. 5,013,811.

[51] Int. Cl.[5] .................. B32B 27/08; B32B 27/40; B32B 33/00; B64D 37/02; B65D 85/84
[52] U.S. Cl. .................................. 428/35.7; 72/76; 206/524.2; 220/562; 220/456; 220/905; 244/135 B; 427/359; 427/407.2; 427/412; 428/36.8; 428/217; 428/219; 428/250; 428/251; 428/252; 428/285; 428/286
[58] Field of Search .................. 72/76; 206/524.2; 220/562, 456, 905; 244/135 B; 428/35.7, 36.8, 250, 251, 252, 285, 286, 287, 423.3, 217, 219, 67

[56] References Cited

U.S. PATENT DOCUMENTS

| | | | |
|---|---|---|---|
| Re. 31,671 | 9/1984 | Bonk et al. | 528/65 |
| 3,401,133 | 9/1968 | Grace et al. | 528/61 |
| 3,508,987 | 4/1970 | Burkley et al. | 156/99 |
| 3,539,424 | 11/1970 | Tasklick | 156/238 |
| 3,655,627 | 4/1972 | Hutzler et al. | 528/64 |
| 3,684,639 | 8/1972 | Keberle et al. | 156/331 |
| 3,758,443 | 9/1973 | Konig et al. | 260/75 NP |
| 3,764,457 | 10/1973 | Chang et al. | 161/183 |
| 3,823,051 | 7/1974 | Chang | 156/99 |
| 3,878,036 | 4/1975 | Chang | 428/424 |
| 3,883,571 | 5/1975 | Allport et al. | 260/453 AM |
| 3,886,102 | 5/1975 | Olstowski | 260/18 TN |
| 3,904,796 | 9/1975 | Zorn et al. | 528/61 |
| 3,935,132 | 1/1976 | Gerkin et al. | 260/2.5 BE |
| 4,031,026 | 6/1977 | Ibbotson | 252/182 |
| 4,072,634 | 2/1978 | Borchert et al. | 260/2.5 A |
| 4,088,616 | 5/1978 | Ichimura et al. | 260/2.5 AY |
| 4,115,429 | 9/1978 | Reiff et al. | 260/453 SP |
| 4,116,741 | 9/1978 | Thoma et al. | 428/423.3 |
| 4,118,411 | 10/1978 | Reiff et al. | 260/453 SP |
| 4,229,347 | 10/1980 | Holt et al. | 260/239 A |
| 4,234,714 | 11/1980 | Earing et al. | 528/67 |
| 4,239,857 | 12/1980 | Harper | 521/121 |
| 4,261,852 | 4/1981 | Carroll et al. | 528/59 |
| 4,306,052 | 12/1981 | Bork et al. | 528/67 |
| 4,307,004 | 12/1981 | Schuhmacher et al. | 528/61 |
| 4,321,333 | 3/1982 | Alberino et al. | 521/121 |
| 4,334,034 | 6/1982 | Lehner et al. | 525/28 |
| 4,384,050 | 5/1983 | Guthrie | 521/137 |
| 4,384,051 | 5/1983 | Guthrie | 521/137 |

(List continued on next page.)

FOREIGN PATENT DOCUMENTS

| | | |
|---|---|---|
| 61-76275 | 4/1986 | Japan . |
| 61-151235 | 7/1986 | Japan . |
| WO90/11329 | 10/1990 | PCT Int'l Appl. . |
| 1382186 | 1/1975 | United Kingdom . |
| 1476268 | 6/1977 | United Kingdom . |

*Primary Examiner*—James C. Cannon
*Attorney, Agent, or Firm*—Pennie & Edmonds

[57] ABSTRACT

A coated fabric comprising a fabric substrate and a coating thereupon, said coating comprising a plurality of layers wherein at least one of the layers comprises a polyester polyurethane having a Shore A hardness of at least 90 durometer, or a linear polyurethane elastomer formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition. Preferably, different layers of these polyurethanes are included.

44 Claims, 5 Drawing Sheets

U.S. PATENT DOCUMENTS

| | | | |
|---|---|---|---|
| 4,423,200 | 12/1983 | Ganster et al. | 528/67 |
| 4,435,527 | 3/1984 | Cuscurida et al. | 521/173 |
| 4,448,938 | 5/1984 | Bruynickx et al. | 525/437 |
| 4,463,141 | 7/1984 | Robinson | 525/467 |
| 4,476,293 | 9/1984 | Robinson | 528/76 |
| 4,478,960 | 10/1984 | Buethe et al. | 521/160 |
| 4,490,300 | 12/1984 | Pantone et al. | 260/453 SP |
| 4,490,301 | 12/1984 | Pantone et al. | 260/453 SP |
| 4,490,302 | 12/1984 | Ma et al. | 260/453 SP |
| 4,533,729 | 8/1985 | Newland et al. | 528/371 |
| 4,539,156 | 9/1985 | Dewhurst et al. | 260/453 SP |
| 4,539,157 | 9/1985 | Dewhurst et al. | 260/453 SP |
| 4,539,158 | 9/1985 | Dewhurst et al. | 260/453 SP |
| 4,581,388 | 4/1986 | Rasshofer et al. | 521/129 |
| 4,581,470 | 4/1986 | Hoy et al. | 560/189 |
| 4,587,322 | 5/1986 | Rasshofer et al. | 528/60 |
| 4,621,105 | 11/1986 | Statton et al. | 521/107 |
| 4,634,743 | 1/1987 | Prier | 525/462 |
| 4,636,531 | 2/1987 | Schmidt | 528/60 |
| 4,647,596 | 3/1987 | Ishii et al. | 521/159 |
| 4,659,772 | 4/1987 | Hoy et al. | 524/755 |
| 4,663,417 | 5/1987 | Hunter et al. | 528/80 |
| 4,677,136 | 6/1987 | Rasshofer et al. | 521/159 |
| 4,683,171 | 7/1987 | Kuga et al. | 528/66 |
| 4,705,721 | 11/1987 | Frisch et al. | 528/66 |
| 4,727,094 | 2/1988 | Hoy et al. | 521/92 |
| 4,743,650 | 5/1988 | Boutni | 525/92 |
| 4,791,187 | 12/1988 | Süling et al. | 528/63 |
| 4,868,268 | 9/1988 | Muller et al. | 528/76 |
| 5,001,208 | 3/1991 | Ross et al. | 528/61 |
| 5,013,811 | 5/1991 | Ross | 528/60 |
| 5,110,666 | 5/1992 | Menzel et al. | 428/196 |

FABRIC STRUCTURE FOR SEVERE USE APPLICATIONS

CROSS REFERENCE TO RELATED APPLICATIONS

This application is a continuation-in-part of application Ser. No. 07/695,852, filed May 6, 1991, now U.S. Pat. No. 5,710,666, which is a continuation-in-part of application Ser. No. 07/326,183, filed Mar. 20, 1989, now U.S. Pat. No. 5,013,811.

TECHNICAL FIELD

The present invention relates to a coated fabric material More specifically, the present invention relates to a composite having a plurality of coating layers which are bound to a woven or nonwoven substrate. This material is specifically designed to be used where the attributes of good abrasion resistance, flexibility, toughness and chemical resistance are required, such as, for instance in rotary flap peening devices or in aircraft fuel cells.

BACKGROUND OF THE INVENTION

In today's market, polyurethane coated fabrics are utilized in a wide array of products and applications, including producing high performance coated fabrics for severe use applications.

Typically, polyurethane elastomers which are considered top of the line with respect to performance, include, for example, polytetramethylene glycol (polyether) polyurethanes and poly(butane adipates or hexane adipates) ester polyurethanes. Of these polymers, the polyether polyurethanes exhibit good hydrolytic stability and low temperature properties but are generally poor for fuel resistance and oxidation resistance, while the polyester polyurethanes are tough with good abrasion resistance, oxidation resistance and fuel resistance, but not particularly resistant to hydrolysis. Still, at the present time the polyesters are generally considered to represent the best compromise of physical properties and chemical resistance of the various polyurethanes.

There are also a few polyurethanes based on polycarbonate polyols in the market. It is well known that these polycarbonate polyurethanes have very good hydrolytic stability and generally have good to very good resistance to other degradation forces; however, these polyurethanes are usually too hard, rigid and brittle for use in industrial coated fabrics.

Currently, high performance coated fabrics are based on polyester polyurethanes in order to meet the specifications currently in effect, but resistance to hydrolysis remains as a weak point and represents a problem for these products Thus, there is a desire for improved hydrolytic stability in a number of applications. A polyurethane having improved hydrolytic properties and sufficient elastomeric character to be useful in the manufacturing of industrial coated fabrics is also desirable and needed In addition, the construction of the fabric reinforcement is important for increasing the strength of the coated fabric. The combination of a high performance polyurethane coating and fabric reinforcement is required to provide a product which is useful for severe use applications. One such application is disclosed in U.S. Pat. No. 3,834,200 to Winter In this patent, a polyurethane impregnated nylon scrim was found to have the desired combination of flexibility, resiliency, toughness and tear resistance for use as a peening flap. As the operational characteristics of such peening devices has been increased, the specific coated fabric disclosed therein, Reevecoat 7625, a conventional polyester polyurethane coated fabric, did not have sufficient mechanical properties to provide a useful service life. Thus, a new coated fabric with improved properties was needed to withstand the improved operational characteristics of the new peening device.

Another severe use application of polyurethane coated fabrics is fuel cell fabrication in the aviation fuel containment field. In a fuel cell, there is provided an inner layer an outer layer and a fuel barrier layer located between the inner and outer layer of the fuel cell. Sometimes, there is also provided a reinforcing or crashworthy layer located between the outer layer and the fuel barrier layer. This crash worthy layer is utilized to retain fuel in the cell in the event of a crash landing. In these fuel cells, polyurethane coated fabrics have been utilized as the inner and/or outer layers, as well as for the crash worthy layer. Again, as technology advances, greater demands are made on these materials in that higher performance is needed in a lighter weight coated fabric.

The performance of these products in a severe use environment is limited by the coated fabric utilized in their manufacture. There is a need for a coated fabric that possess good abrasion resistance, toughness, strength, chemical resistance, flexibility and resiliency for use in such applications. There is also a need for a coated fabric that provides a longer useful life in such applications to keep pace with advances in the devices in which they are used to improve the operation or economy of such devices.

SUMMARY OF THE INVENTION

In accordance with the present invention, a new coated fabric has been developed which exhibits increased durability and ease of manufacture. The coated fabric is flexible, resilient, tough, shock absorbing, and tear resistant and has a high flexural endurance as well as good shape retention. The present invention relates to a fabric substrate which is coated with a plurality of layers including a first polycarbonate-polyether polyurethane and a second polymer. Each of the layers can include one or more coats of the desired polyurethane or polymer, preferably applied by a three-head coating machine.

The preferred polycarbonate-polyether polyurethane comprises a mixture of a polycarbonate polyol and a polyether polyol, a diisocyanate compound and first and second extenders. The first extender preferably has a molecular weight of less than about 500, and the diisocyanate compound is initially reacted with the first extender in a molar ratio of above 2:1 to form a modified diisocyanate component having a functionality of about 2 prior to reaction with the other components. The modified diisocyanate component provides relatively low temperature processing properties to the composition, whereas the polyol mixture provides superior hydrolytic stability and low temperature flexibility to the composition. The polyurethane may also be crosslinked to provide a stiffer coated fabric by adding a crosslinking agent such as an organic isocyanate compound.

At least a portion of the fabric substrate may include, as an initial layer, an adhesion aid to assist in the bonding of the coating layers thereto. This adhesion aid is preferably an aziridine compound. If desired, the fabric substrate and initial layer are heated to further increase the degree of adhesion provided by the aziridine compound. Also, one or more of the layers may include a silicone compound in an amount effective to increase the tear resistance of the coated fabric.

At least one of the layers includes a second polymer such as polyurethane or an elastomer. The polyurethane of the second polymer may be a polyester polyurethane, and may further include a crosslinking agent, such as an organic isocyanate compound, to increase the stiffness of the coated fabric. Instead of a second polyurethane, an elastomer of natural, nitrile or neoprene rubber may be used.

While it is preferable to utilize a polyester polyurethane which has a durometer hardness of 90 Shore A or greater as the second polymer, this material can be used in certain severe use applications instead of the polyether-polycarbonate polyurethane described above. If desired, a crosslinking agent may be included to increase the stiffness of coated fabrics which include this polyester polyurethane.

The fabric substrate preferably has a weight of between about 4 and 12 ounces per square yard; and more preferably, between about 6 and 10 ounces per square yard. Also the fabric substrate may be woven, and may be comprised of nylon or polyester fiber, filament or spun yarn.

If desired, at least one of the layers, preferably the outermost layer, is calendered, and this calendered layer preferably includes the first polyurethane. Also, the calendered layer may include a millable linear polyurethane elastomer in an amount sufficient to reduce the processing temperature of the layer by at least 10° F., to assist in the calendering operation. If desired, a cure package can be included for increasing the tensile strength of the millable linear polyurethane elastomer.

The invention also relates to an article comprising the coated fabric described above and having a plurality of rivets attached thereto.

In addition, the invention relates to a fuel cell comprising an inner ply configured and adapted for retaining fuel therein; an outer ply configured and adapted to provide handling and abrasion resistance to the fuel cell; and a fuel barrier ply located between the inner and outer plies to reduce the permeability of the cell to hydrocarbon fuel; wherein at least one of the inner or outer plies comprises the polycarbonate-polyether polyurethane described above to impart improved hydrolytic stability to the cell. Alternatively, at least one of the inner or outer plies may comprise a polyester polyurethane having a durometer hardness of 90 Shore A or greater to increase the strength of the fabric structure of the cell.

DETAILED DESCRIPTION OF THE INVENTION

Figure 1:
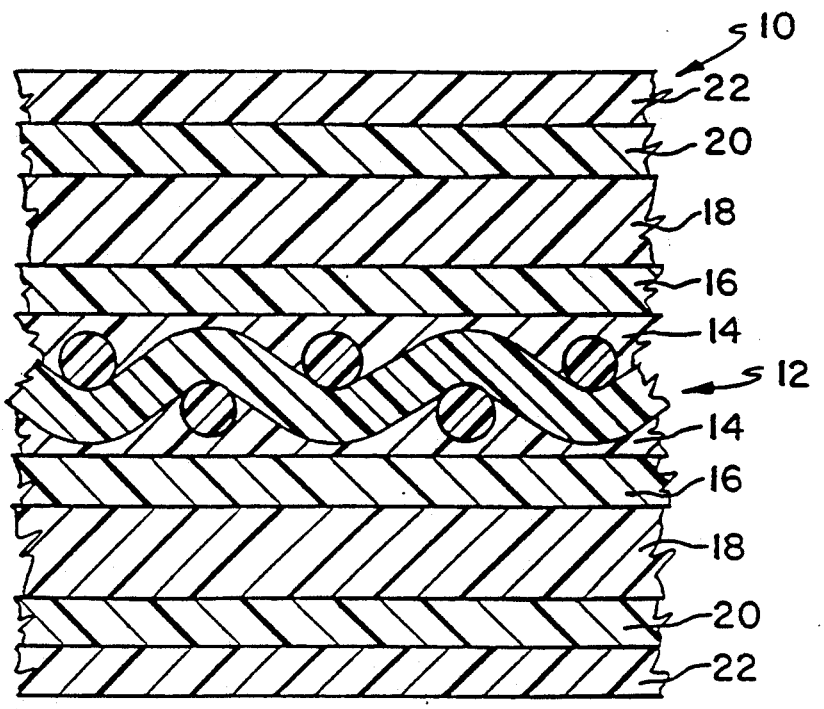
FIG. 1 illustrates a cross-sectional view of one embodiment of the coated fabric of the present invention.

The invention resides in a coated fabric having an unusual combination of physical properties which is especially useful for severe use applications, such as the peening flap of a rotating abrasion device which is used for removing paint, corrosion and/or heavy scale from metal or other surfaces, or for aircraft fuel cells or other industrial applications requiring a high performance coated fabric.

The present invention includes a fabric substrate, substructure or sheet material coated thereon with a combination of one or more polymers. The term "fabric" as used herein generally refers to a base substrate of fiber, yarn or other flexible material, whether random, non-woven, woven, knitted or braided, and upon which various polymers are applied by coating or calendering.

Preferably, a combination of polymers in separate layers is used to form the coating. The most preferred polymer is a polycarbonate-polyether polyurethane. The most preferred polycarbonate-polyether polyurethane used as the first polymer in one of the layers of the coating is known as Morthane CA-1225 (Morton International) and comprises a mixture of a polycarbonate polyol and a polyether polyol; a diisocyanate compound; and first and second extenders. While this polyurethane is generally described below, U.S. Pat. No. 5,001,208 provides a more detailed description of this polyurethane and its method of manufacture, and is expressly incorporated herein by reference thereto.

The polyether polyol and polycarbonate polyol can be used in any relative amounts provided that each are present in the composition. As noted above, the polyether polyol provides low temperature flexibility characteristics to the polyurethane, while the polycarbonate polyol imparts superior hydrolytic stability. It has been found convenient to use a polyether polyol:polycarbonate polyol ratio in the range of between 2:1 to 1:8.

Generally, polyols having a molecular weight of between about 60 and 500 (and preferably less than 250) have been found to be advantageous as extenders. Specific polyols include diols such as 1,3-butanediol, ethylene glycol, tripropylene glycol, dipropylene glycol, propylene glycol, and neopentyl glycol; triols such as trimethylol propane, as well as mixtures of these components, can be used. Amines, such as ethylene diamine can also be used as extenders.

Any diisocyanate compound is suitable with those based on 4,4'-diphenyl methane diisocyanate being preferred. The term "MDI" will be used throughout this application to designate diisocyanate compounds primarily based on 4,4'-diphenyl methane diisocyanate. The diisocyanate compound is initially reacted with one of the extenders which has a molecular weight of less than about 500 in a molar ratio of about 2:1 so as to form a modified diisocyanate component having a functionality of about 2 prior to reaction with the other components. The term "liquid MDI" will be used to designate an essentially difunctional modified MDI component prepared from the reaction of a low molecular weight polyol with an MDI component to form a modified diisocyanate composition which is liquid at room temperature. Preferably, the modified diisocyanate is reacted sequentially, first with the polyol mixture, then with the other extender, so that a linear thermoplastic polyurethane elastomer is formed.

The relative amount of modified diisocyanate to polyol ranges from about 2:1 to 20:1, and preferably between about 2.5:1 and 8:1. The modified diisocyanate and the second extender enable the polymer to have low temperature processing properties of up to about 40° F. lower compared to those wherein the diisocyanate is not modified. This polymer has elastomeric characteristics and other physical properties which render it suitable for use in coated fabric manufacturing processes, and produces a coated fabric that is flexible, tough, tear resistant, resilient, and has a high flexural endurance as well as good shape retention.

Another preferred group of polymers which may be used in the coated fabrics of this invention includes linear polyurethane elastomers formed by reacting a diisocyanate compound with an extender component having a molecular weight of 500 or less to form a modified diisocyanate component having a functionality of about 2 and then reacting the modified diisocyanate component with a polyol component and another extender component, either sequentially or together. These elastomers possess a unique, desirable combination of hydrolytic stability, toughness, and flexibility, and can be processed at lower temperatures compared to elastomers prepared from similar compositions wherein the components are reacted by a "one-shot" process or by a polyol-isocyanate prepolymer process. Further details on these elastomers can be found in U.S. Pat. No. 5,013,811, the content of which is expressly incorporated herein by reference.

These polyurethanes may also be crosslinked by adding a crosslinking agent such as an organic isocyanate compound to increase the stiffness of the resulting coated fabric. Suitable organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, MDI, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2',5,5'-tetraisocyanate and polymeric polyisocyanates such as polymethylene polyphenylene polyisocyanate. Especially useful due to their availability and properties are toluene diisocyanate, MDI, and polymethylene polyphenylene polyisocyanate.

Other polymers may also be included in the coating, such as other polyurethanes or elastomers such as nitrile, natural or neoprene rubber. In the specific formulations described herein, a polyester polyurethane having a Shore A hardness of 90 or greater is preferred for use in combination with the polyurethane elastomers described above. In certain applications, multiple layers of that polyester polyurethane can be used to form the desired coating. The hardness of the polyester polyurethane is greater than what is normally used in conventional polyurethane top coats for coated fabrics, since flexibility is typically desired in conventional coated fabrics. In severe use applications, however, it has been found that a more rigid coated fabric is necessary to provide increased service life. Thus, harder polyester polyurethanes are used, and crosslinking agents may be included to further increase the stiffness of the final coated fabric. The resultant fabric is capable of providing a significantly increased service life compared to the softer, more flexible counterparts, as shown below in the Examples and in FIG. 5.

Moreover, any of the polyurethanes may be strengthened by adding a crosslinking agent, such as the organic isocyanate compounds described above, to increase the stiffness of the resulting coated fabric. The overall stiffness or flexibility of the resulting fabric can therefore be varied by increasing or decreasing the number of layers utilizing crosslinked polyurethanes. Additionally, different layers of these polyurethanes are preferably utilized in the coated fabric to provide the correct combination of stiffness and mechanical properties, as explained in further detail below.

Referring now to FIG. 1, there is illustrated a coated fabric according to the present invention generally designated as 10. This coated fabric 10 comprises a fabric substrate 12 and a plurality of layers comprised of single or multiple coatings materials provided thereon generally on both sides of the fabric substrate. When symmetrical layers and coating materials are provided on each side of the fabric substrate, the coated fabric is described as "balanced", while an "unbalanced" coated fabric would include a different number of layers, coating materials, or thicknesses thereof. It should be understood that both balanced and unbalanced coated fabrics are within the scope of this invention.

Coated fabrics utilize a fabric substrate 12 to give the coated fabric integrity. The fabric material may include one or more layers or arrangements of fibers of various materials, weights, thicknesses and widths depending on the type of coated fabric product which is desired. The various configurations of fabric are generally known in the art and need not be explained in detail here. While the fabric providing the best mechanical properties required for a peening flap has been found to be a woven nylon fabric, the invention is not limited to woven fabrics and encompasses non-woven substrates as well. In addition, other natural or synthetic staple or non-staple fibers or yarns could be used in a mat, woven, knitted or braided configuration to form the fabric substrate.

When woven fabrics are to be used, polyester or fiberglass fibers or blends thereof are suitable. Polyester fibers or fabrics have less moisture absorption and better long term heat aging compared to nylon, and would be preferred for applications requiring such properties. One skilled in the art can select by routine testing the best materials, structure, denier, etc. of the fibers or yarns for the fabric substrate depending upon the particular application or end use of the coated fabric.

For example, a two ply 840 denier high tenacity nylon 66 filament yarn woven into a basket weave construction consisting of 34 warp (length direction) and 34 weft (cross width direction) yarns has been found to provide the optimum mechanical properties of compression and density required for the fabric substrate of a peening flap. For that application, the weight of the fabric should be between 5 and 11.5 ounces per square yard ("osy"), preferably between 6–10 osy and most preferably about 8 osy. Also, the denier of the nylon fiber can vary over a range of about 400 to 1100, preferably about 600 to 1000, depending upon the number of warp and weft fibers. To retain the rivets in the fabric, it has been found that a 21 warp by 21 weft 840 denier 5 osy woven nylon fabric was insufficient, as was a 38 warp by 38 weft 1050 denier 11½ osy woven nylon fabric. These fabric substrates are suitable for other applications, such as in fuel cell construction, where the 38×38 1050 denier 11½ osy fabric imparts optimum tensile strength and tear resistance to the coated fabric. Thus, one skilled in the art can select the combination of size, count, weave, weight and material of the fabric substrate for the particular end use of the coated fabric by routine testing.

To the fabric substrate 12 there is preferably applied a pretreatment chemical 14 to aid in adhesion of the subsequently applied coating. The pretreatment step can consist of applying an aziridine compound by, for example, a dipping process. A preferred aziridine compound is CX-100, which is available from ICI Resins, Wilmington, Mass.

The aziridine compound is mixed with an aqueous or organic solvent, such as water or toluene, in an amount of about 3 to 10 and preferably about 6 to 8 parts by weight and the fabric is dipped into the mixture. Then, the wetted fabric is heated in an oven to a sufficient temperature to drive off the solvent. Generally, about 195° to 230° F. (90° to 110° C.) is sufficient, depending upon the specific solvent used.

It has also been found that coating adhesion to the fabric can be substantially increased by heating the aziridine wetted fabric to higher temperatures of at least about 300° to 350° F. (i.e. 150° to 170° C.). It is believed that such higher temperatures cause the aziridine ring to open and, thus, much more reactive toward the subsequently applied coatings. When heated to these temperatures, an aziridine treated nylon fabric which is subsequently coated with a polyurethane elastomer exhibits about 100–200% improvement in peel strength (i.e., from about 15 to about 30–45 psi).

To the pretreated 14 fabric substrate 12 is provided a single or plurality of layers which each include one or more coatings of polymeric materials. The overall thickness of each of the layers can be as described and will generally be between 0.05 and 0.125 inches. For heavier thickness of the polymeric material, a single layer may be calendered, although adhesion to the fabric may be slightly reduced depending upon the construction of the fabric. For optimum adhesion, the thickness of the polymeric material is built up in layers, with each layer being deposited in one or preferably a plurality of coatings of the desired polymeric material. Also, by depositing a plurality of coatings, it is possible to include the crosslinking agent in one or more of the coatings for increasing the stiffness of the fabric.

A preferred construction of the coated fabric material has a polyester polyurethane 16 which contains a crosslinking agent, as the first layer adjacent each side of the pretreated fabric, followed by a layer of the preferred polycarbonate-polyether polycarbonate 18 adjacent each polyester polyurethane layer 16. Finally, a layer of polycarbonate-polyether polyurethane 20 which contains a crosslinking agent is applied adjacent each layer 18. The outermost layers 22 can be a polyester polyurethane with or without the crosslinking agent.

If desired, any or all of layers 16 through 22 can contain pigments, fillers, stabilizers, or other conventional additives. It has been found that the addition of a small amount of a silicone compound, such as L-42 (Union Carbide), has been found advantageous to increase the resiliency and tear strength of the overall fabric. This material is used in an amount of about 0.1 to 2 parts based on 100 parts polymer, with 0.5 to 1 part being preferred. This enables the fabric to provide increased performance with respect to its ability to retain rivets or other objects upon the fabric under severe operating conditions.

While each layer may be composed of a different polymer composition, it is advantageous that at least one and preferably more than one layer should contain the preferred polycarbonate-polyether polyurethane (Morthane CA-1225). Of course, several layers can contain this same polyurethane composition, either with or without the crosslinking agent, while other layers may contain any one of the different polymer materials described above. A preferred polyurethane material for one or more of the other layers is a polyester polyurethane having a durometer hardness of 90 Shore A or greater, such as Estane 5707-F1 (B. F. Goodrich) or Rucothane CO-A-5054 (Ruco Chemicals). Some layers of these other polyurethanes may also include an organic isocyanate compound to form crosslinked polyurethanes. As noted above, the isocyanates are added to the polyurethanes to increase stiffness of the resulting composite structure. A wide variety of combinations of layers of different polyurethanes or other polymeric materials can be used, depending upon the particular application of the coated fabric. Also, as noted above, each layer is made from a plurality of coats of the desired material, or of mixtures of different but compatible polymeric materials.

Figure 2:
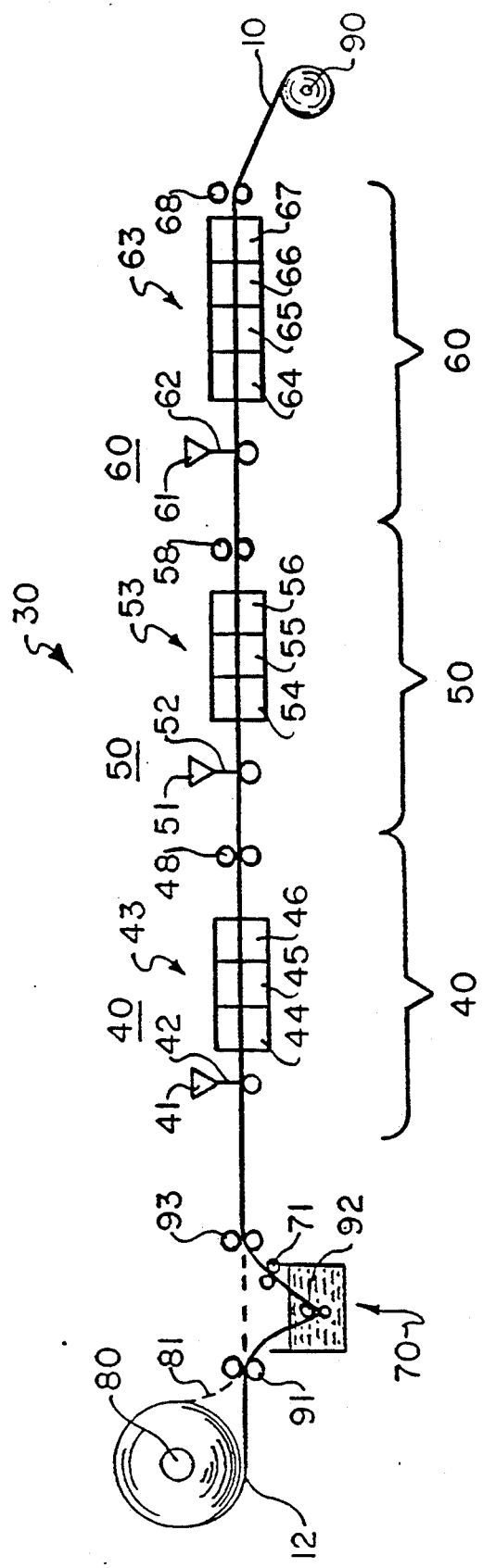
FIG. 2 illustrates a three head coating machine as used in the manufacture of the coated fabric of the present invention.

In FIG. 2, there is schematically illustrated 1a three head coater machine 30 which includes a dipping tank 70, unwind roll 80 and take-up or wind-up roll 90. While a three head coater machine is preferred, the coated fabric of the present invention can also be manufactured utilizing a one head coating machine, that is a coating machine with a single head, although that would take a longer time to complete the buildup of the desired plurality of layers.

The coated fabric can also be produced by calendering the polymeric materials onto the fabric, where the individual components of each layer are initially prepared in sheet form and then are bonded together between rollers under heat and pressure. In this process, the crosslinking component is generally not included in the layers. When calendering this material, the fabric substrate is initially coated with the aziridine compound and the first few layers of polymer on one side prior to calendering the remaining layers to the initially coated fabric. Thereafter, the material can be turned over, and the other side of the substrate coated with the first few layers of polymer for that side, followed by the calendering process to add the remaining layers to final dimension.

When using a calendering process to apply the coatings to the fabric, it is advantageous to add a millable linear elastomer having a pendent or extra-linear

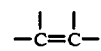

to lower the processing temperature of the coating material by at least about 10° F. A preferred material is Morthane CA-1217, although Vibrathane V-5008 (Uniroyal Chemical), Millathane HT (TSE Ind.) and Adiprene E (Uniroyal Chemical) could also be used. The strength of the millable materials can be enhanced by adding a curing agent, preferably comprising one or more sulfur compounds, and by vulcanizing the final product.

Further description of the use of the millable elastomer to reduce the processing temperature can be found PCT application WO90/11329 published Oct. 4, 1990. That application is expressly incorporated herein by reference thereto to the extent necessary to understand this aspect of the invention.

The three head coating machine 30 has three coating systems 40, 50 and 60. Each coating system contains a coating head 41, 51 and 61. Coating compound is dispensed at each coating head as the fabric substrate 12 passes through the machine 30. Located at each coating head 41, 51 and 61 are knife blades 42, 52 and 62. Each knife blade 42, 52 and 62 is independently adjustable. The knife blades can be set such that they do not contact the passing fabric substrate 12 or coated fabric 10. The knife blades can also be set to float or ride over the passing coated fabric 10 or fabric substrate 12, with this technique generally known as "floating knife," or the knife blade can be set to a predetermined setting, which is generally known as "knife over roll." The knife blades 42, 52 and 62 distribute and spread the coating composition in a uniform thickness over the fabric substrate 12 or coated fabric 10. Different thicknesses for the knife blades may be used, with thicknesses ranging from about 1/16 to ⅛" being typical. The "floating knife" position is utilized during the initial passes of the fabric substrate or coated fabric to avoid damaging the fabric substrate or coated fabric, while the "knife over roll"0 technique is utilized to build up a desired coating thickness on the coated fabric.

Located behind each knife blade 42, 52 and 62 are ovens 43, 53 and 63 respectively. Ovens 43 and 53 each contain three independently controlled zones 44, 45 and 46 as well as 54, 55 and 56 respectively. The third oven 63 has four independently controlled zones, 64, 65, 66 and 67. The ovens remove the solvent from the coating composition while the last zone provides a final cure to the coating composition.

Following each oven 43, 53 and 63 there is provided cooling rollers 48, 58 and 68. These cooling rollers 48, 58 and 68 cool the fabric substrate 12 or coated fabric 10 as it exits the ovens.

The main advantage between the three head coater machine 30 just described and a single head coater machine is the shorter amount of time needed to apply multiple layers of polymer to the fabric.

Located before the coater machine 30 is a dipping tank or bath 70. The dipping tank is utilized to apply the aziridine pretreatment to the fabric substrate 12 to aid in adhesion of the coating composition, as noted above. The dipping tank or bath 70 is provided with squeeze rolls 71 to remove excess material applied during the dipping operation. The aziridine dipped fabric can then be heated in the ovens which are located behind the knife blades. When the dipping tank is not utilized, the fabric substrate 12 or coated fabric can either pass over the dipping tank or the dipping tank can be emptied such that no material is applied as the coated fabric or fabric substrate passes through. In addition, the dip tank can be portable so that it can be removed when not utilized.

During operation, the fabric is mounted on unwind roll 80 and passed through rollers 91, rollers 92 if pretreatment is desired, and rollers 93 as well as the three head coater machine 30 from which the coated fabric substrate 12 exits and is mounted on take up roll 90.

The three head coater machine 30 applies the coating composition to only one side of the fabric substrate 12 and applies either the same or as many as three different compositions during any one pass. To coat both sides of the material of the coated fabric, the roll of material on take up roll 90 after completely passing through the three head coater machine 30 will be remounted on unwind roll 80 such that the material will be fed into the three head coater machine 30 such that the coating composition will be applied to the second side of the coated fabric. This is illustrated in FIG. 2 by dashed line 81 which represents the coated fabric 10 unwinding from the unwind roll 80 without passing through bath 70.

The fabric substrate 12 or coated fabric 10 can be passed through the three head coater machine at various rates of speed. By varying the speed the substrate moves, the amount of the composition applied, the blade settings and the oven temperatures, a wide array of coated fabrics can be manufactured. These variations are known to one skilled in the art and need not be detailed herein.

Figure 3:
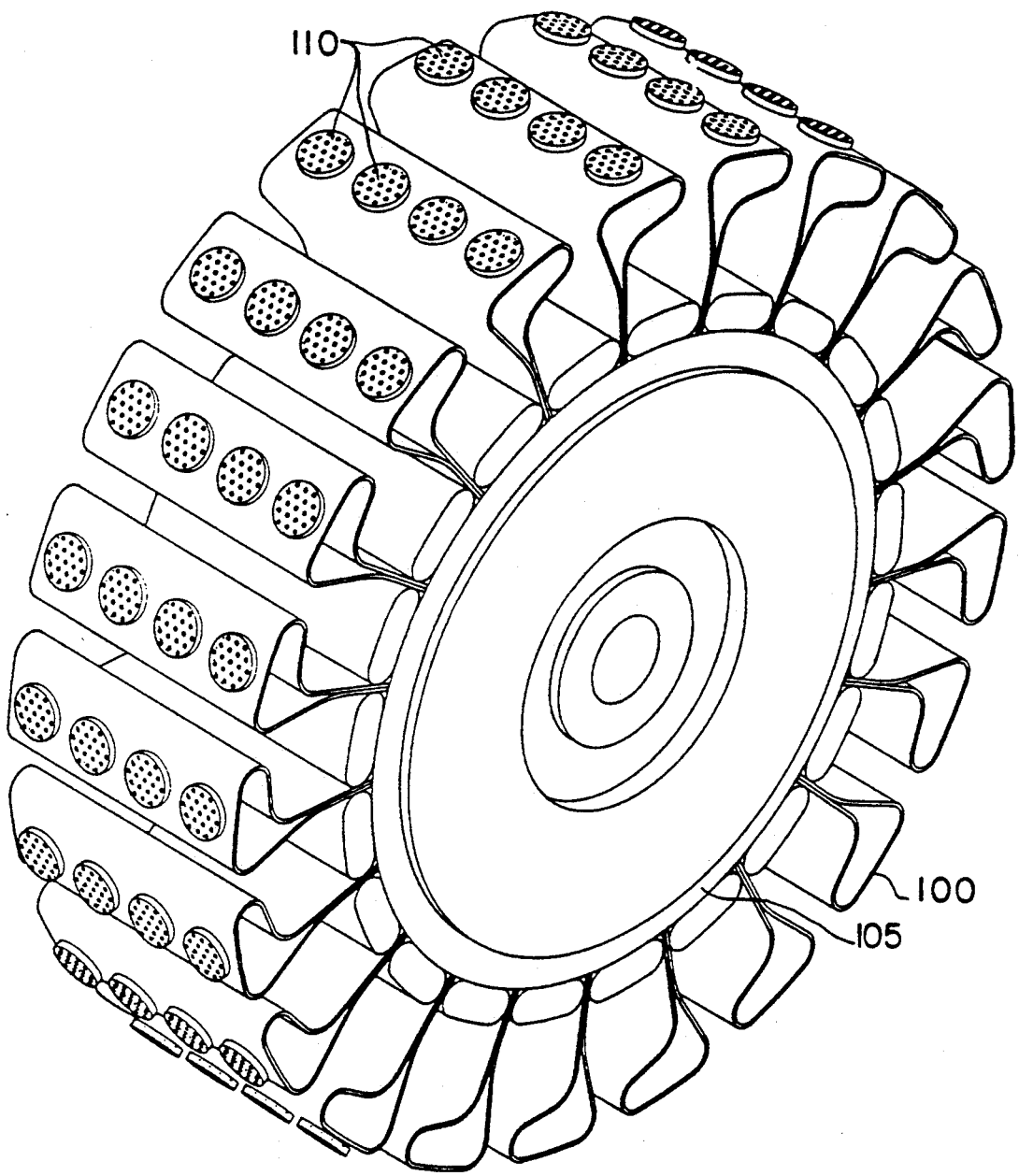
FIG. 3 illustrates the coated fabric of the present invention as it is employed in an abrading device.

In FIG. 3, there is illustrated the coated fabric of the present invention as it is used for rivet attachment in a rotary peening operation. The coated fabric 100 is configured and adapted to be connected to a hub 105 as shown in a copending U.S. patent application entitled improved High-Intensity RotoPeen Flaps, Method of Making Same, Wheels Incorporating Same, and Methods of Using Wheels Incorporating Same, filed of even date herewith U.S. Ser. No. 07/788,550, now U.S. Pat. No. 5,203,189, the content of which is expressly incorporated herein by reference thereto to explain the preferred mechanical features of the flap, hub and rivets. Rivets 110 are attached to the fabric in a manner which exposes their top surfaces to the area to be peened when hub 14 is rotated. The coated fabric 100 must have sufficient flexibility to allow it to be configured and adapted into the proper shape so that the rivets are properly aligned to strike the object to be peened while also being sufficiently stiff and tough to keep the rivets in proper striking alignment and to remain connected to the hub during the peening operation.

Figure 4:
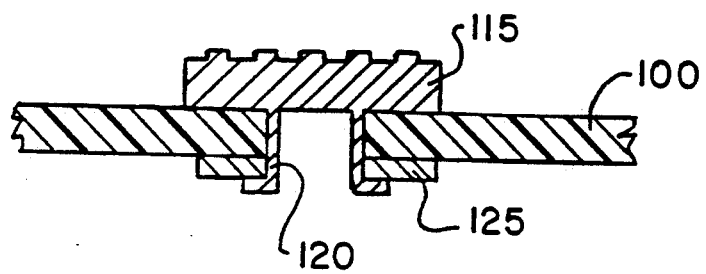
FIG. 4 is a cross-sectional illustration of the attachment of a rivet to the fabric of the invention.

The rivets 16 and their attachment to the fabric are shown in greater detail in FIG. 4. The rivets 110 include a top surface 115 and a hollow mounting pedestal 120. The top surfaces are made from a hardened steel and are designed to provide a useful service life of about 110 hours in rotary peening operations. These rivets 110 are attached to the fabric 100 through holes which are configured to be the same diameter as the outer diameter of the pedestal 120. After the pedestal 120 passes through the fabric hole, a washer 125 is placed against the fabric 100 and the end 130 of the pedestal 120 is crimped over the washer 125 to securely retain the rivet in the fabric hole.

The fabric construction is important for retaining the rivets during the peening operations at speeds up to about 1800 to 2000 RPM for a 6" diameter hub. A 34 warp by 34 weft 840 denier two ply woven nylon fabric having a weight of 8 osy has been found to be preferred for this application.

EXAMPLES

The scope of the invention is further described in connection with the following examples which are set forth with the sole purpose of illustrating the embodiments of the invention and which are not to be construed as limiting the scope of the invention in any manner.

The following examples were prepared using one or more of the following compounds. In these examples, all parts given are by weight unless otherwise specified. Also, viscosity measurements were made using a Brookfield RF Viscometer with a No. 6 spindle at 20 RPM.

| Compound A | | |
|---|---|---|
| Component | Wet Weight | Dry Weight |
| Polyester Polyurethane (Estane 5707-F1) | 50 | 50 |
| Fungicide (Vinyzene BP 5-2) | 1 | 0.1 |
| Stabilizer (Staboxol P) | 1 | 1 |
| DMF (solvent) | 65 | 0 |
| THF (solvent) | 65 | 0 |
| Toluene (solvent) | 65 | 0 |

The DMF (dimethyl formamide), THF (tetrahydrofuran) and toluene solvents were combined, and the stabilizer and fungicide were added to the solvents and mixed well. The polyurethane was then added slowly with mixing until a uniform solution viscosity of about 3500 cps is obtained.

| Compound B | | |
|---|---|---|
| Component | Wet Weight | Dry Weight |
| Compound A | 100 | 20.69 |
| MDI polymeric isocyanate (PAPI 2027) | 3.5 | 3.5 |
| Silicone additive | 0.6 | 0.6 |

All components were mixed together and the viscosity was adjusted to 2500 cps with THF.

| Compound C | | |
|---|---|---|
| Component | Wet Weight | Dry Weight |
| Polycarbonate-Polyether Polyurethane (Morthane CA-1225) | 62.3 | 62.3 |
| TiO$_2$ white pigment | 2.4 | 2.4 |
| Black pigment (Jet Black 2970) | 0.1 | 0.1 |
| Yellow iron oxide pigment | 3.6 | 3.6 |
| Terracotta iron oxide | 0.1 | 0.1 |
| Fumed Silica Filler (OK 412) | 6.2 | 6.2 |
| Toluene (solvent) | 105 | 0 |
| DMF (solvent) | 70 | 0 |

The pigment, filler and solvents were mixed together and then the polycarbonate-polyether polyurethane was added. The components were mixed until all were completely in solution. The viscosity was then adjusted to 5500 cps with a 50/50 mixture of DMF and toluene.

| Compound D | | |
|---|---|---|
| Component | Wet Weight | Dry Weight |
| Compound C | 100 | 29.9 |
| MDI polymeric isocyanate (PAPI 2027) | 2 | 2 |

The isocyanate component was added to compound C just before spreading.

| Compound E | | |
|---|---|---|
| Component | Wet Weight | Dry Weight |
| Polyester Polyurethane (Estane 5707-F1) | 59 | 59 |
| antioxidant (Uvinul D-49) | 0.6 | 0.6 |
| fungicide (Vinyzene BP 5-2) | 1.2 | 0.12 |
| stabilizer (Stabaxol P) | 1.2 | 1.2 |
| filler (OK-412) | 5.9 | 5.9 |
| TiO$_2$ white pigment | 2.3 | 2.3 |
| Yellow iron oxide pigment | 3.4 | 3.4 |
| Black iron oxide pigment | 0.04 | 0.04 |
| Terracotta iron oxide pigment | 0.1 | 0.1 |
| DMF (solvent) | 88 | 0 |
| Toluene (solvent) | 88 | 0 |

The pigment, filler, stabilizer, fungicide and antioxidant were added to the solvent and mixed well. Then, the polyester polyurethane was added and mixed until it was completely in solution. The viscosity was adjusted to 5500 cps with a 50/50 mixture of DMF/toluene.

| Compound F | | |
|---|---|---|
| Component | Wet Weight | Dry Weight |
| aziridine | 6 | 6 |
| Toluene (solvent) | 100 | 0 |

These components were simply mixed together to form a solution.

EXAMPLE 1

A coated fabric is produced by taking the preferred 2 ply woven nylon fabric (basket weave) having a denier of 840 and a weight of 8 ounces per square yard ("osy") and coating it with the above described compounds in the following manner:

First Step: 0.1 osy of fabric pretreatment compound F is applied to the fabric in dip tank 70 and passed through ovens 40, 50, 60 of the three head coater machine 30. During this initial step the knife blades are not set and no material is applied by the coating heads. However, the coated fabric is passed through the three head coater machine at ten yards per minute ("ypm") while the three zones of the first and second ovens 40, 50 are set at 160° C., 160° C. and 170° C. respectively and the four zones of the third oven 60 are set at 160° C., 160° C., 170° C. and 170° C. respectively.

The fabric is then wound on roller 90 and returned to again pass through the machine 30. One of the above described compounds is then applied by each of the three heads. For each subsequent pass of fabric through the machine 30, the three zones of the first and second oven 40, 50 are set at 65° C., 80° C. and 110° C. respectively and the four zones of the third oven 60 are set at 65° C., 80° C., 110° C. and 110° C. respectively. Also, a knife blade having a thickness of 1/16" is used for coating head 1 while a knife blade having a thickness of ⅛" is used for coating heads 2 and 3.

Second Step: The fabric is passed through the machine at 10 ypm. To the first side of the fabric 0.5 osy of compound B is applied by both the first and second heads, and 0.5 osy of compound E is applied by the third head. For this step, the knife at head 1 is set so that it floats over the fabric, i.e., as the floating knife embodiment described above, while the knives at heads 2 and 3 are set over the roller.

Third Step: The fabric is passed through the coater machine at 10 ypm and to the first side of the fabric 0.4 osy of compound C is applied by both the first and the second heads, and 0.4 osy of compound E is applied by the third head. During this step, the knife blades are set as in the second step.

Fourth Step: The fabric is passed through the coater machine at 8 ypm to coat the second side of the fabric. 0.5 osy of compound B is added by both the first and second heads and 0.4 osy of compound E is applied by the third head. For this step, the knife blades are set as in the second step.

Fifth Step: The fabric is passed through the machine at 8 ypm to coat the second side of the fabric. 0.4 osy of compound C is applied by both the first and second heads and 0.4 osy of compound E is applied by the third head. For this and all subsequent steps, the knife blades are set over the rollers, i.e., as the knife over roll embodiment described above.

Sixth Step: The fabric is passed through the machine at 8 ypm to coat the first side of the fabric. 0.4 osy of compound C is applied by both the first and second heads and 0.4 osy of compound E is applied by the third head..

Seventh Step: The fabric is passed through the machine at 8 ypm to coat the first side of the fabric. 0.4 osy of compound C is applied by both the first and second heads and 0.4 osy of compound E is applied by the third head.

Eighth Step: The fabric is passed through the machine at 8 ypm to coat the second side of the fabric. 0.4 osy of compound C is applied by both the first and second heads and 0.4 osy of compound E is applied by the third head.

Ninth Step: The fabric is passed through the machine at 8 ypm to coat the second side of the fabric. 0.4 osy of compound C is applied by both the first and second heads and 0.4 osy of compound E is applied by the third head.

Tenth Step: The fabric is passed through the machine at 8 ypm to coat the first side of the fabric. 0.4 osy of compound C is applied by both the first and second heads and 0.4 osy of compound E is applied by the third head.

Eleventh Step: The fabric is passed through the machine at 8 ypm to coat the first side of the fabric. 0.4 osy of compound C is applied by both the first and second heads and 0.4 osy of compound E is applied by the third head.

Twelfth Step: The fabric is passed through the machine at 8 ypm to coat the second side of the fabric. 0.4 osy of compound C is applied by both the first and second heads and 0.4 osy of compound E is applied by the third head.

Thirteenth Step: The fabric is passed through the machine at 8 ypm to coat the second side of the fabric. 0.4 osy of compound C is applied by both the first and second heads and 0.4 osy of compound E is applied by the third head.

Fourteenth Step: The fabric is passed through the machine at 8 ypm to coat the first side of the fabric. 0.4 osy of compound D is applied by both the first and second heads and 0.4 osy of compound E is applied by the third head.

Fifteenth Step: The fabric is passed through the coating machine at 8 ypm to coat the first side of the fabric. 0.4 osy of compound D is applied by both the first and second heads and 0.4 osy of compound E is applied by the third head.

Sixteenth Step: The fabric is passed through the machine at 8 ypm to coat the second side of the fabric. 0.4 osy of compound D is applied by both the first and second heads and 0.4 osy of compound E is applied by the third head.

Seventeenth Step: The fabric is passed through the machine at 8 ypm to coat the second side of the fabric. 0.4 osy of compound D is applied by both the first and second heads, and 0.4 osy of compound E is applied by the third head.

The final coated fabric has a gauge of 0.037 inches+0.002, −0.001 inches with a finished weight of 27.7 osy.

It is believed that the Morthane CA-1225 polycarbonate-polyether polyurethane layer provides flexibility, chemical resistance and compression properties to the coated fabric. The heat and abrasion resistance of the overall fabric is believed to be enhanced by the use of interleafing crosslinked layers of the Morthane CA-1225 polyurethane with the Estane 5707-F1 polyester polyurethane.

EXAMPLES 2-13

Additional coated fabric samples were made using the same machine as in Example 1. Also, for each sample, an initial coating of Compound F and a total thickness was used as described in Example 1. For Examples 2-6, the fabric weight was 8 osy. For Examples 2-12, steps 2-7 were applications of Formulation G: 100 parts Rucothane CO-A-5054, 3.5 parts of Papi 2027 (an isocyanate crosslinking agent), 0.5 parts Stabaxol and 1.5 parts X-Air (three steps on each side of the aziridine treated fabric). The remaining layers (steps 8-17) were applied as follows:

EXAMPLE 2

All remaining steps applied Estane 5707-F1 with isocyanate (Formulation B), five steps on each side, to form a balanced coating.

EXAMPLE 3

Steps 12-17 were the same as Example 2. Steps 8-11 applied two steps of Formulation A to each side of the fabric.

EXAMPLE 4

Steps 8-17 applied Morthane CA-1225 with isocyanate (Formulation D), five steps on each side of the fabric.

EXAMPLE 5

Steps 12-17 were the same as Example 4 (i.e., three passes of Formulation D on each side of the substrate). Steps 8-11 applied 2 passes on each side of the substrate of Formulation C to improve the flexibility of the fabric.

EXAMPLE 6

Same as Example 4 except that one side of the fabric has one pass (Step 8) of Formulation C. This creates an unbalanced coated fabric which has more flexibility than Example 4 but less than Example 5.

EXAMPLE 7-11 (Comparative)

Examples 2-6 were repeated, except that the fabric weight was 11.5 osy.

EXAMPLE 12

Example 4 was repeated, except that the fabric weight was 5 osy.

EXAMPLE 13

To a 5 osy fabric substrate, two passes of Formulation G were applied (one on each side), followed by two passes of Formulation C (one on each side) and two passes of Formulation D (one on each side). Finally, both sides are calendered with an 0.011" film comprising an 80/20 blend of Morthane CA-1225 and Morthane CA-1217. A cure package of 11.2 parts MBTS, 2.8 parts MBT, 4.2 parts sulfur and 1.4 parts Caytur-4 is added during manufacture of the film. After calendering, the fabric is subject to conventional vulcanizing temperatures to crosslink the film and improve the tensile strength of the coated fabric.

The relative performance of each of these coated fabrics was determined during a rotary peening operation. Results were as follows:

| Coated Fabric of Example | Average hours for 50% Rivet loss |
| --- | --- |
| 1 | 100[a] |
| 2 | 58[b] |
| 3 | 56 |
| 4 | 67.5[b] |
| 5 | 69 |
| 6 | 74.5 |
| 7 | 35[b] |
| 8 | 47.5 |
| 9 | 41.5 |
| 10 | 61.5 |
| 11 | 63[a] |
| 12 | 74.5 |
| 13 | 71[a, c] |

[a] testing was discontinued with some samples not yet achieving a rivet loss of 50%.
[b] cracking occurred in the coating.
[c] delamination observed between the coating and fabric.

Coated fabric performance in these tests is measured by rivet loss during the rotary peening operation. A rivet loss of 50% is used as the point at which the useful life of the coated fabric is completed.

Prior coated fabric materials for similar rotary peening applications exhibited a maximum useful life of only about 10 to 15 operational hours for a polyester polyurethane coated 5 osy 840 denier fabric, such as the Reevecoat 7625 fabric mentioned above. The coated fabric of Example 1 has provided over 100 hours of useful service before testing was discontinued. Since the rivets have a useful life of only about 110 to 115 operational hours, that fabric provides essentially equivalent performance to that of the rivets. The coated fabric of Example 1 thus provides optimum performance in this application. Since the prior art, such as the Reevecoat 7625 fabric mentioned above, was capable of achieving a maximum of only about 10 to 15 hours service, other coated fabric constructions of the invention can be used even though a service life of about 35 to 75 hours is obtained, because this is a substantial improvement over the prior art.

Figure 5:
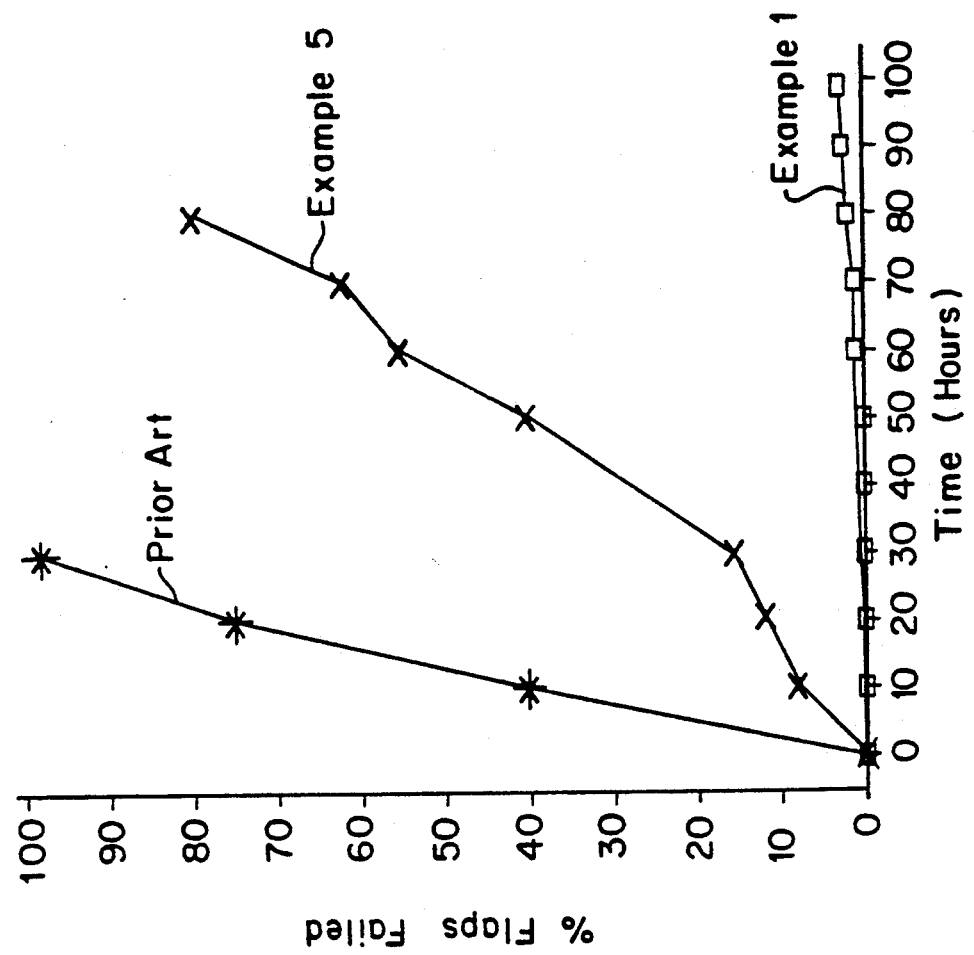
FIG. 5 is a graphical representation of the results of various coated fabrics in a flap peening test.

These results are graphically illustrated in FIG. 5. The curve labeled "Prior Art" is for tests using Reevecoat 7625. The middle curve illustrates the performance of Example 5 while the curve labeled "Example 1" shows the dramatic improvement utilizing the most preferred fabric construction according to the invention. As noted above, however, the formulations illustrated by the middle curve also provides substantial improvement over the prior art Reevecoat 7625.

In addition, these coated fabrics have utility in other severe use applications, such as in fuel cell fabrication. Fuel cells are primarily used in aircraft and automobile racing applications where increased crashworthiness is vital. There are essentially three basic designs utilized in fuel cell construction.

A first type of fuel cell is the bladder. The bladder type fuel cell has a laminated structure comprising at least three-plies of elastomeric material and including an inner ply, a middle fuel-resistant ply, and an outer ply. The inner ply functions to contact and retain fuel and must be highly fuel resistant. The middle ply of a bladder type fuel cell functions as a fuel barrier so as to decrease the overall permeability of the bladder to hydrocarbon fuel. The outer layer is designed to resist external abrasion and handling damage as well as to equal the fuel resistant qualities of the inner layer. In the past, nitrile rubber coated nylon fabric has been utilized for inner and outer plies of fuel bladders, whereas a sprayed on nylon material has been utilized for the fuel resistant barrier.

A standard non-sealing bladder construction includes inner and outer plies comprised of a 2 to 25 osy nylon fabric impregnated on both sides with nitrile rubber, with a middle ply of a nylon fuel barrier. The stress loads to which the fuel bladder will be subject determine what weight fabric will be utilized for the inner and outer plies. The fineness of the nylon material utilized in the nylon fabric may range from about 40 to 100 denier on warp and fill yarns, and from 0 to 10 t.p.i. with plain weave fabric. During the fabrication of the bladder, the nylon fuel barrier is spray applied to the inner ply. Adhesive nylon cement is applied between the plies of the nylon fuel barrier and the nitrile rubber coated fabric to aid adhesion.

A second type of fuel cell has a "self-sealing" design to meet the requirements of gun fire protection. This design comprises an inner ply, an outer ply, a fuel resistant barrier located between the inner and outer plies and one or more plies of a low viscosity natural (self-sealing) rubber coated nylon fabric located between the fuel barrier and the outer ply. Perforations of the natural rubber-coated nylon fabric are effectively sealed because the natural rubber swells into such perforations. The inner and outer plies and fuel resistant barrier are the same as is used in the fuel bladder discussed above.

A third type of fuel cell is the crashworthy design. This fuel cell configuration is designed to hold fuel and withstand increased mechanical loads placed on the cell, such as impact due to a crash. The crashworthy fuel cell comprises an inner ply, an outer ply, and a fuel barrier located between the inner and outer ply as described above. Also, one or more nitrile rubber coated nylon fabric reinforcing plies are located between the fuel barrier and the outer ply to provide such impact resistance to the cell. The outermost reinforcing ply may serve as the outer ply of the fuel cell or a non-reinforced outer ply may be provided. The strength of the crashworthy cell may be increased by utilizing additional reinforcing plies, or by selecting heavier weight nylon fabrics. These nylon fabrics would again range from about 2 to about 25 osy.

All three types of fuel cells function as bladders for containment of fuel. It is also possible for a fuel cell to incorporate both the self-seal and the crashworthiness functions by utilizing both natural rubber-coated fabric and reinforcing plies in its construction.

In the past, fuel cell fabrication has necessitated time consuming and complex labor intensive procedures. As discussed above, typical fuel cell designs of the past have comprised a nitrile rubber coated fabric inner and outer ply. In fabricating a prior art fuel cell, a tool form is selected conforming to the desired dimensions of a particular fuel cell application. As a coated fabric, nitrile rubber coated nylon must be pattern cut and hand laid in separate sections on a tool form. Where the edge of one section meets another a lap joint has to be made. The amount of overlap of nylon fabric at the lap determines the strength of the lap joint, and depending on the application involved, a specific amount of overlap is selected. Polymer adhesives are utilized to bond sections of the pattern cut nylon fabric at the lap. These laps cause a local increase in thickness and weight. Utilizing such lap joints also increase the possibility for defects such as delaminations, separations or blisters. The nitrile-coated fabric plies required in the prior art fuel cell fabrication required hand application with great care and effort so as to avoid wrinkles, blisters and other defects. Even with meticulous fabrication effort, the inherent lap construction of these cells limits their durability.

To eliminate the limitations of hand laid, pattern cut fuel cell plies, polyurethanes sometimes have been substituted for nitrile rubber. These polyurethane materials have been used in spray-on manufacture of fuel cell plies. However, the polyurethanes selected for spray fabrication of cell plies in the past have been unsatisfactory due to a greatly decreased service life as compared to nitrile rubber coated nylon plies.

There have been essentially three classes of polyfunctional alcohols commercially available for reaction with diisocyanates to yield the polyurethanes utilized in fuel cell plies. These classes are the polyester, polyoxypropylene, and polyoxytetramethylene polyols.

Polyester polyurethanes have not been used in spray applications since they are high viscosity liquids. Additionally, these compounds are not desirable because they are hydrolytically unstable. Water may be found, as a contaminant, in aviation fuel where it may attack the inner ply of a fuel cell. Condensation may also occur on the outer ply wall of a fuel cell. It is therefore important that inner and outer fuel cell plies exhibit excellent hydrolytic stability in order to prolong service life of the cell.

Polyoxypropylene polyols (PPG) and Polyoxytetramethyl polyols (PTMEG) are commercially available at viscosities which allow spray application. In one example of polyurethane fuel cell fabrication of the prior art, low viscosity polyurethane is spray applied to a tool form. After this low viscosity polyurethane has cured, an inner fuel cell ply is formed. This inner ply may be reinforced with fabric. A fuel barrier layer is at least partially cured, an outer ply of polyurethane is applied by a spraying technique. This outer ply may also be reinforced with fiber.

Although the form spraying technique utilizing polyurethane is highly efficient as compared to nitrile rubber techniques, the PTMEG and PPG polyurethane polymers utilized in the past bladder wall construction have exhibited certain disadvantages. PPG and PTMEG polyurethanes utilized have limited hydrocarbon fuel, solvent, and chemical resistance. These polyurethane compositions also have limited hydrolytic resistance. Although the polyurethanes used in the past for fuel cell wall construction offered time savings over nitrile rubber techniques, the physical limitations of the specific polyurethanes utilized in the prior art adversely affected the service life of fuel cells.

In the present invention, it has been found that the polycarbonate-polyether polyurethane can be used as one or more of the fuel cell plies with improved performance. This polyurethane can be formulated for spray application, or can be coated onto a fabric utilizing the coating machine described above or by calendering. This polyurethane provides improved hydrolytic stability and flexibility compared to conventional polyester polyurethanes and, when used as either the inner or outer fuel cell plies (or both), the service life of the cell is prolonged due to the excellent hydrolytic stability of this material.

As previously discussed, the inner and outer plies of a fuel cell must be comprised of a material possessing superior chemical, solvent, and hydrocarbon resistance. Outer fuel cell plies may be exposed to solvents, such as hydraulic fluid and lubricants. Water may condense on the outer ply as well as leak through the structure surrounding the fuel cell. Perforations in the laminate plies deeper within the fuel cell may expose the outer ply, acting as a last fuel barrier, to hydrocarbon fuel. The inner ply will constantly be exposed to hydrocarbon fuel. Additives, such as solvents, and contaminants such as water may also be present within fuel supplies and thus contact the inner ply. Thus the inner and outer ply must be resistant to all of these substances so as to prolong service life of the fuel cell, and of course, to prevent fuel leaks and potential disaster. The superior solvent, hydrocarbon, and chemical resistance of the polycarbonate-polyether polyurethane inner and outer plies increases the projected service life of a fuel cell incorporating them.

In addition, as compared to prior art fuel cell plies such as nitrile rubber-coated fabric, polycarbonate-polyether polyurethane plies utilized in the present invention are simpler and less costly to construct as they may be spray, brush, or spread coat applied or calendered prior to application. Furthermore, the absence of lap joints when spray application is used decreases the likelihood of ply failure due to leaks and delamination.

In another aspect of the present invention, one of the inner ply or the outer ply of a fuel cell may be comprised of the polycarbonate-polyether polyurethane, while the other may be a conventional nitrile rubber coated nylon fabric. The polycarbonate-polyether polyurethane inner or outer ply is applied by spray, brush, spread coat or calendering nylon fabric weights ranging from about 2 to 25 osy, preferably 6–12 osy, are utilized in these plies. As is well known in the art, increasing fabric weight increases the strength of the ply and thus the strength of the fuel cell. A nylon adhesive cement is applied between the nylon fuel barrier and the nitrile rubber ply so as to insure adequate bonding. A nylon fuel barrier is then spray applied onto the nylon adhesive cement so as to form the nylon fuel barrier. Adhesive cement is not necessary for providing adhesion between the nylon fuel barrier ply and the polyurethane inner or outer ply.

Although this embodiment of the present invention requires more time to place and lap a nitrile rubber coated fabric ply than another embodiment in which both the inner and outer plies are polyurethanes, the resulting fuel cells achieve greater strength, while retaining the ease of manufacture and superior hydrolytic stability and durability of at least one ply comprised of the polyurethane.

Another embodiment of the present invention additionally comprises a crashworthy fuel cell feature. The crashworthy feature is provided by incorporating at least one additional nylon fabric reinforcing ply in the fuel cell, said one or more reinforcing plies located between the fuel barrier and the outer ply. The nylon fabric reinforcing ply may be coated with the polycarbonate-polyether polyurethane, optionally with the crosslinking agent if desired.

In another embodiment of the present invention, a self-sealing fuel cell is provided. The self-sealing fuel cell comprises an inner and outer ply, at least one of which is the polycarbonate-polyether polyurethane, a nylon fuel barrier located between the inner and outer plies, and at least one natural rubber coated nylon fabric ply located between the fuel barrier and the outer ply. The natural rubber is of a low viscosity so as to allow the rubber to swell into and seal perforations of the coated fabric.

Yet another embodiment of the present invention provides both a self-seal and crashworthy fuel cell. The self-sealing crashworthy cell comprises an inner and outer ply, at least one of which is the polycarbonate-polyether polyurethane, a fuel barrier located between the inner and outer plies, at least one natural rubber coated fabric ply located between the fuel barrier and the outer ply, and/or at least one reinforcing ply located between the natural rubber coated fabric and the outer ply. Thus greater hydrolytic, fuel, chemical, and solvent resistance as well as a crashworthy and self-sealing feature are provided in one fuel cell.

If desired, some of the layers of the coating formulation may be made of a polyester polyurethane having a Shore A hardness at least 90 or more. The combination of the polyether-polycarbonate polyurethane and this polyester polyurethane provides both high strength and good hydrolytic stability in the overall coating formulation.

It is apparent that the aforementioned embodiments fully describe various aspects of the invention to one skilled in the art, and the appended claims are intended to cover all such embodiments that fall within the true spirit and scope of this invention.

What is claimed:

1. A coated fabric having abrasion resistance, flexibility toughness and chemical resistance suitable for use in flap peening devices or aircraft fuel cells comprising a fabric substrate and a coating thereupon, said coating comprising a plurality of layers wherein at least one of the layers comprises a first linear polyurethane elastomer formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition; and another of said layers comprises a polyester polyurethane.

2. The coated fabric of claim 1 wherein the polyol is a mixture of a polyether polyol and a polycarbonate polyol, wherein the polyester polyol is present in an amount which provides low temperature flexibility properties to the coating, while the polycarbonate polyol is present in an amount which provides superior hydrolytic stability to the coating.

3. An article comprising the coated fabric of claim 2 and a plurality of rivets attached thereto.

4. The coated fabric of claim 1 wherein at least one layer includes the first polyurethane and a crosslinking agent.

5. The coated fabric of claim 4 wherein the crosslinking agent is an isocyanate compound.

6. The coated fabric of claim 4 wherein the layer of the first polyurethane and crosslinking agent is the outermost layer.

7. The coated fabric of claim 1 wherein at least one of the layers is calendered.

8. The coated fabric of claim 7 wherein the outermost layer is calendered.

9. The coated fabric of claim 7 wherein the calendered layer includes the first polyurethane.

10. The coated fabric of claim 7 wherein the calendered layer includes a millable linear polyurethane elastomer in an amount sufficient to reduce the processing temperature of the layer by at least 10° F.

11. The coated fabric of claim 10 wherein the calendered layer includes a cure package for increasing the strength of the millable linear polyurethane elastomer.

12. The coated fabric of claim 1 wherein another of the layers comprises an elastomer.

13. The coated fabric of claim 12 wherein the elastomer is natural, nitrile or neoprene rubber.

14. The coated fabric of claim 1 wherein the fabric substance has a weight of between about 4 and 12 osy.

15. The coated fabric of claim 14 wherein the fabric substrate has a weight of between about 6 and 10 osy.

16. The coated fabric of claim 14 wherein the fabric substrate is woven.

17. The coated fabric of claim 166 wherein the fabric substrate comprises nylon or polyester fiber or yarn.

18. The coated fabric of claim 1 wherein the outermost layer includes a polyurethane and a crosslinking agent.

19. The coated fabric of claim 1 wherein the polyester polyurethane layer further includes a crosslinking agent.

20. The coated fabric of claim 1 wherein one or more of the layers comprise a second polymer of a polyester polyurethane having a Shore A hardness of 90 durometer or greater.

21. An article comprising the coated fabric of claim 1 and a plurality of rivets attached thereto.

22. A coated fabric comprising a fabric having abrasion resistance, flexibility, toughness and chemical resistance suitable for use in flap peening devices or aircraft fuel cells substrate and a coating thereupon, said coating comprising a plurality of layers wherein at least one of the layers comprises a first linear polyurethane elastomer formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition; wherein one or more of the layers includes a silicone compound in an amount effective to increase the tear resistance of the coated fabric.

23. A coated fabric comprising a fabric having abrasion resistance, flexibility, toughness and chemical resistance suitable for use in flap peening devices or aircraft fuel cells substrate and a coating thereupon, said coating comprising a plurality of layers wherein at least one of the layers comprises a first linear polyurethane elastomer formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition; and further comprising an initial layer of an adhesion aid applied upon at least a portion of the fabric substrate to aid in the bonding of the coating layers thereto.

24. The coated fabric of claim 3 wherein the adhesion aid is an aziridine compound.

25. The coated fabric of claim 24 wherein the fabric substrate and initial layer are heated to further increase the degree of adhesion provided by the aziridine compound.

26. An aircraft fuel cell comprising:
an inner ply configured and adapted for retaining fuel therein;
an outer ply configured and adapted to provide handling and abrasion resistance to the fuel cell; and
a fuel barrier ply located between said inner and said outer plies to reduce the permeability of the cell to hydrocarbon fuel;
wherein at least one of said inner and outer plies comprises a linear polyurethane formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition, said polyurethane configured and adapted to provide improved chemical and hydrolytic resistance to the cell.

27. The fuel cell of claim 26 wherein the linear polyurethane further contains a fabric having a weight of from about 2 to 25 osy.

28. The fuel cell of claim 27 wherein said linear polyurethane is applied in layers onto the fabric, and wherein the ply includes layers of a polyester polyurethane having a Shore A hardness of at least about 90 durometer.

29. The fuel cell of claim 26 wherein the linear polyurethane forms the inner ply.

30. The fuel cell of claim 29 wherein the outer ply is a nitrile rubber coated fabric, having a fabric weight of from about 2 to 25 osy.

31. The fuel cell of claim 30 further comprising an adhesive cement for providing adhesion between the nitrile rubber coated fabric and the fuel barrier.

32. The fuel cell of claim 26 wherein the linear polyurethane is used for both the inner and outer plies.

33. The fuel cell of claim 26 wherein the linear polyurethane forms the outer ply.

34. The fuel cell of claim 33 wherein the linear polyurethane further contains a fabric having a weight of from about 2 to 25 osy.

35. The fuel cell of claim 34 wherein said linear polyurethane is applied in layers onto the fabric, and wherein the ply includes layers of a polyester polyurethane having a Shore A hardness of at least about 90 durometer.

36. The fuel cell of claim 35 wherein the inner ply is a nitrile rubber coated fabric, having a fabric weight of from about 2 to 25 osy.

37. The fuel cell of claim 36 further comprising an adhesive cement for bonding the nitrile coated fabric to the fuel barrier.

38. The fuel cell of claim 26 further comprising at least one ply of a rubber coated fabric located between the fuel barrier and the outer ply, said rubber coated fabric having a fabric weight of from about 2 to 25 osy, and sufficiently low viscosity to swell into and substantially seal perforations therein, thus providing a self-sealing capability to the fuel cell.

39. The fuel cell of claim 26 further comprising at least one fabric reinforcing ply, having a fabric weight of from about 2 to 25 osy and located between the fuel barrier and the outer ply to provide crashworthiness to the fuel cell.

40. The fuel cell of claim 39 wherein the reinforcing ply further comprises a polyurethane formed from a polyol; a diisocyanate compound; a first extender component having a molecular weight of below about 500; and a second extender component; wherein the diisocyanate compound is initially reacted with the first extender component in a molar ratio of above 2:1 to form a modified diisocyanate component having a functionality of about 2 prior to reaction with the other components to provide relatively low temperature processing properties to the composition.

41. The fuel cell of claim 40 wherein said linear polyurethane is applied in layers onto the fabric, and wherein the ply includes layers of a polyester polyurethane having a Shore A hardness of at least about 90 durometer.

42. The fuel cell of claim 40 further comprising at least one ply of a rubber coated fabric located between the fuel barrier and the outer ply, said rubber coated fabric having a fabric weight of from about 2 to 25 osy, and sufficiently low viscosity to swell into and substantially seal perforations therein, thus providing a self-sealing capability to the fuel cell.

43. The fuel cell of claim 39 wherein the polyester polyurethane having a Shore A hardness of at least about 90 durometer.

44. The fuel cell of claim 43 further comprising at least one ply of a rubber coated fabric located between the fuel barrier and the outer ply, said rubber coated fabric having a fabric weight of from about 2 to 25 osy, and sufficiently low viscosity to swell into and substantially seal perforations therein, thus providing a self-sealing capability to the fuel cell.

* * * * *